(12) United States Patent
Chiricescu et al.

(10) Patent No.: US 7,978,670 B2
(45) Date of Patent: Jul. 12, 2011

(54) METHOD AND APPARATUS TO FACILITATE BANDWIDTH ALLOCATION MANAGEMENT IN INTEGRAL COMBINATION WITH MEMORY CAPACITY INFORMATION

(75) Inventors: Silviu Chiricescu, Chicago, IL (US); Ali Saidi, St. Charles, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 928 days.

(21) Appl. No.: 11/835,221

(22) Filed: Aug. 7, 2007

(65) Prior Publication Data

US 2009/0042580 A1  Feb. 12, 2009

(51) Int. Cl.
*H04W 4/00* (2009.01)
(52) U.S. Cl. .......................... 370/338; 370/400; 455/450
(58) Field of Classification Search .................. 370/252, 370/255, 328–329, 338, 345, 350, 400–401, 370/410, 428, 465, 468; 455/450, 452.1, 455/452.2
See application file for complete search history.

(56) References Cited

U.S. PATENT DOCUMENTS

| | | | |
|---|---|---|---|
| 6,636,488 B1 | 10/2003 | Varma | |
| 6,771,595 B1 | 8/2004 | Gilbert et al. | |
| 6,980,511 B1 | 12/2005 | Li et al. | |
| 7,069,346 B2 * | 6/2006 | Lee | 709/250 |
| 7,177,298 B2 | 2/2007 | Chillariga | |
| 7,324,553 B1 * | 1/2008 | Varier et al. | 370/468 |
| 7,551,569 B2 * | 6/2009 | Vasseur | 370/252 |
| 7,567,512 B1 * | 7/2009 | Minei et al. | 370/232 |
| 7,616,582 B2 * | 11/2009 | Jeffery et al. | 370/249 |
| 7,843,843 B1 * | 11/2010 | Papp et al. | 370/252 |
| 2002/0031126 A1 * | 3/2002 | Crichton et al. | 370/394 |
| 2005/0276231 A1 * | 12/2005 | Ayyagari | 370/254 |
| 2008/0070625 A1 * | 3/2008 | Drackett et al. | 455/556.2 |
| 2008/0298391 A1 * | 12/2008 | Feroz et al. | 370/468 |

FOREIGN PATENT DOCUMENTS

EP  1 043 908 A2  11/2000

OTHER PUBLICATIONS

Heon Ju Jeong, "PCT International Search Report and Written Opinion," WIPO, ISA/KR, Korean Intellectual Property Office, Daejeon, Republic of Korea, Nov. 26, 2008.
S. Shakkottai, T.S. Rappaport, P.C. Karisson, P.C., "Cross-layer Design for Wireless Networks," Jun. 23, 2003, pp. 1-14; http://users.ece.utexas.edu/~shakkott/Pubs/cross-layer.pdf.
S. Shakkottai, T.S. Rappaport, P.C. Karisson, P.C., "Cross-layer Design for Wireless Networks," IEEE Communications Magazine, v 41, No. 10, Oct. 2003, pp. 74-80.

* cited by examiner

*Primary Examiner* — Chi H. Pham
*Assistant Examiner* — Kevin Mew

(57) ABSTRACT

A method and apparatus to facilitate managing communications with at least one wireless node (102, 103) having an outbound payload memory in a severely resource-constrained wireless network (100) can provide for a coordinator node (101) for that network providing (201) information regarding remaining capacity of those outbound payload memories and then automatically using (202) that information in integral combination with a bandwidth allocation management process to control allocation of at least one wireless communication resource by which the wireless nodes can transmit items contained in the outbound payload memory.

18 Claims, 3 Drawing Sheets

US 7,978,670 B2

METHOD AND APPARATUS TO FACILITATE BANDWIDTH ALLOCATION MANAGEMENT IN INTEGRAL COMBINATION WITH MEMORY CAPACITY INFORMATION

TECHNICAL FIELD

This invention relates generally to wireless nodes having outbound payload memory and more particularly to the management of communications in a severely resource-constrained wireless network.

BACKGROUND

Wireless communications networks of various kinds are known in the art. In some cases, as with some wireless sensor node networks, the network comprises a severely resource-constrained wireless network. In some cases, such constraints may comprise hardware resource constraints. Such a network can comprise, for example, a plurality of wireless sensor nodes that are low power devices having only a very small portable power source (such as a 1.5 volt battery having no more than, say, 1800 milliamphours of capacity and only a very limited amount of outbound payload memory (such as, for example, no more than a few bytes, such as, for example, 128 bytes of storage capacity). Such a device will typically have a relatively brief operational life before, for example, the onboard power supply becomes depleted. This operational life, however, will be even briefer if such reserves are frequently expended in favor of frequently transmitting data in order to keep space in the outbound payload memory available to receive and store new data.

In some cases, such resource constraints comprise a constraint as corresponds to system resources. For example, a severely resource-constrained wireless network may also feature severe constraints with respect to available effective bandwidth (be that available carrier frequencies, time slots, spreading codes, or the like). Such constraints can be rendered worse when seeking to accommodate a network such as a wireless sensor network that may conceivably feature hundreds or even thousands of sensors that all need access to such resources in order to convey their payloads. In such a case, it can be literally impossible to permit each and every node to transmit when and as they require in order to maintain their own platform resources (such as battery power and buffer memory) at some individually optimum level of usage.

Typical prior art approaches address and resolve such system-based resource constraints using a dynamic bandwidth allocation approach that is independent of the aforementioned hardware resource constraints. This approach in fact works well in numerous application settings and hence has prompted little in the way of fundamental change in this regard. It is the applicant's observation, however, that such an approach can lead to over-provisioning of resources in wireless nodes in a severely resource-constrained wireless network with bandwidth resources which, while lending an appearance of satisfactory operation in the sense of fostering a retrieval of node-sourced data, nevertheless tends to strap one or more platform-based resources in a manner that is ultimately detrimental to the overall operation of the system.

BRIEF DESCRIPTION OF THE DRAWINGS

The above needs are at least partially met through provision of the method and apparatus to facilitate bandwidth allocation management in integral combination with memory capacity information described in the following detailed description, particularly when studied in conjunction with the drawings, wherein.

Figure 1:
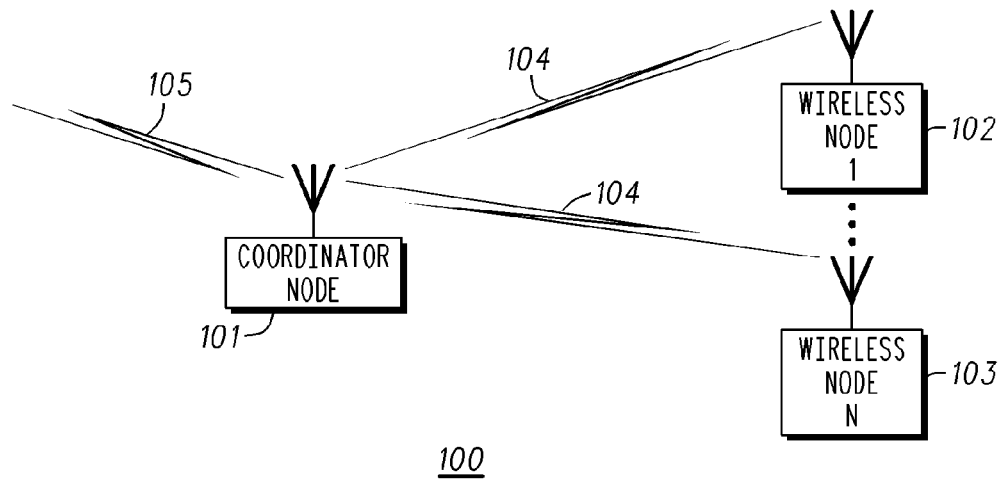
FIG. 1 comprises a block diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, a method to facilitate managing communications with at least one wireless node having outbound payload memory in a severely resource-constrained wireless network can provide for a coordinator node for that network that provides information regarding remaining capacity of those outbound payload memories and then automatically uses that information in integral combination with a bandwidth allocation management process to control allocation of at least one wireless communication resource by which the wireless nodes can transmit items contained in the outbound payload memory.

By one approach, these teachings will accommodate using a threshold maximum value and/or a threshold maximum value as corresponds to remaining capacity for such outbound payload memories. When, for example, remaining capacity for a given wireless node's outbound payload memory is less than a predetermined minimum amount, this process will accommodate then determining at least one measure of link quality as corresponds to a communication path between the wireless node and the coordinator of that wireless node. When that measure of link quality is less than some minimum acceptable level of link quality, this process can provide for allocating substantially only a sufficient quantity of the aforementioned wireless communication resource (or resources) as may be necessary to increase that remaining capacity to more than this predetermined threshold (rather than, for example, allocating a quantity of resources that will more likely, if successful, result in substantially or completing emptying that memory). Conversely, when the communication path exhibits an acceptable level of link quality, this process can tend instead towards allocating a quantity of resources as will be sufficient to increase the remaining capacity of the wireless node to considerably more than this predetermined minimum threshold. (As used herein, references to "link quality" will be understood to refer specifically to link quality as corresponds to a communication path between the wireless node and the coordinator of that wireless node.)

As another example in this regard, when the remaining capacity exceeds some predetermined maximum threshold, this process can optionally provide for determining a measure of confidence in the remaining capacity information itself. When confidence in this information is acceptable, these teachings can optionally provide for not allocating the aforementioned wireless communication resource to the wireless node in question. When, however, confidence is relatively low, this process can optionally provide for allocating some relatively minimal quantity of resources (such as, for example, a single time slot where the resources comprise time slots) in order to permit the wireless node the opportunity to update the information regarding the remaining capacity of the outbound payload memory.

Those skilled in the art will appreciate that, by integrally combining communication resource allocation with platform specific resource information, a useful and beneficial balance can result that can tend to ensure both the prolonged operational life of individual network components will nevertheless tending to ensure that scare platform resources are not overrun by local needs and that network communication resources are similarly properly and beneficially allocated.

These and other benefits may become clearer upon making a thorough review and study of the following detailed description. Referring now to the drawings, and in particular to FIG. 1, as noted, these teachings are relevant to employing a coordinator node 101 to facilitate the management of communications with one or more wireless nodes (exemplified here by a first wireless node 102 through an Nth wireless node 103, where "N" will be understood to comprise an integer greater than one) in a severely resource-constrained wireless network 100.

For the purposes of illustration and not by way of limitation, such a network 100 can be configured, for example, in a so-called star configuration (where each of the aforementioned wireless nodes 102, 103 communicate directly via corresponding wireless communication paths 104 with the coordinator node 101), though other configurations are possible as well. In such a case, the coordinator node 101 will often also be configured to occasionally transmit 105 aggregated data as has been received from the various wireless nodes 102, 103. Such a transmission 105 may be offered directly to a final intended recipient or may be provided to yet another coordinator node that serves, in turn, to pass that information to a final intended recipient. Such architectural configurations and their corresponding operational options are well known in the art. As the present teachings are not unduly sensitive to the selection of any particular approach in this regard, for the sake of brevity further elaboration in this regard will not be provided here.

Figure 2:
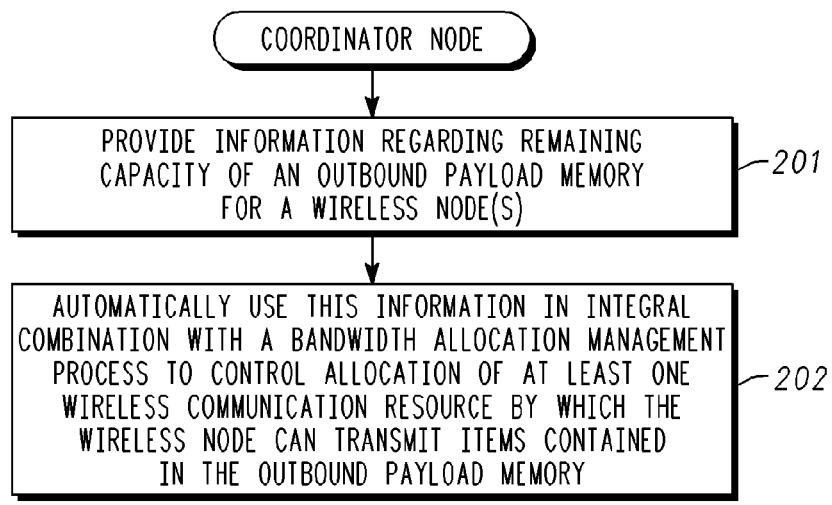
FIG. 2 comprises a flow diagram as configured in accordance with various embodiments of the invention.

Referring now to FIG. 2, an illustrative process that is compatible with many of these teachings will now be presented. This process 200 can be carried out, for example, by a coordinator node as was briefly described above, though other possibilities exist in this regard as well. This process 200 provides for provision 201 of information regarding the remaining capacity of the outbound payload memory of one or more wireless nodes (such as, but not limited to, wireless sensor nodes as are known in the art with which the coordinator node communicates).

Such information can be provided 201 via various mechanisms. By one approach, for example, this can comprise, at least in part, receiving some or all of this information from at least one of the wireless nodes. For example, and by way of illustration, each wireless node can occasionally provide information regarding the remaining capacity of its own onboard outbound payload memory to the coordinator node via a corresponding transmission. As such transmissions are likely, in many application settings, to only be occasional (as versus constant or frequent), it is possible that such information will comprise recent, though possibly outdated, information regarding the remaining capacity of such outbound payload memories. That is, although the information may have been recently received from a given wireless node (for example, within the last few minutes or, depending upon the application setting, within the last few hours), that information may no longer accurately and exactly reflect the current remaining capacity status of the outbound payload memory.

Such a circumstance might be viewed as comprising an obstacle to implementation of these teachings and a point of corresponding discouragement. The applicant has determined however, that such need not necessarily be the case. Further elaboration in this regard is set forth below where appropriate.

This process 200 then provides for automatically using 202 this information regarding the remaining capacity of the outbound payload memory in integral combination with a bandwidth allocation management process to control allocation of at least one wireless communication resource by which the at least one wireless node can transmit items contained in the outbound payload memory.

Figure 3:
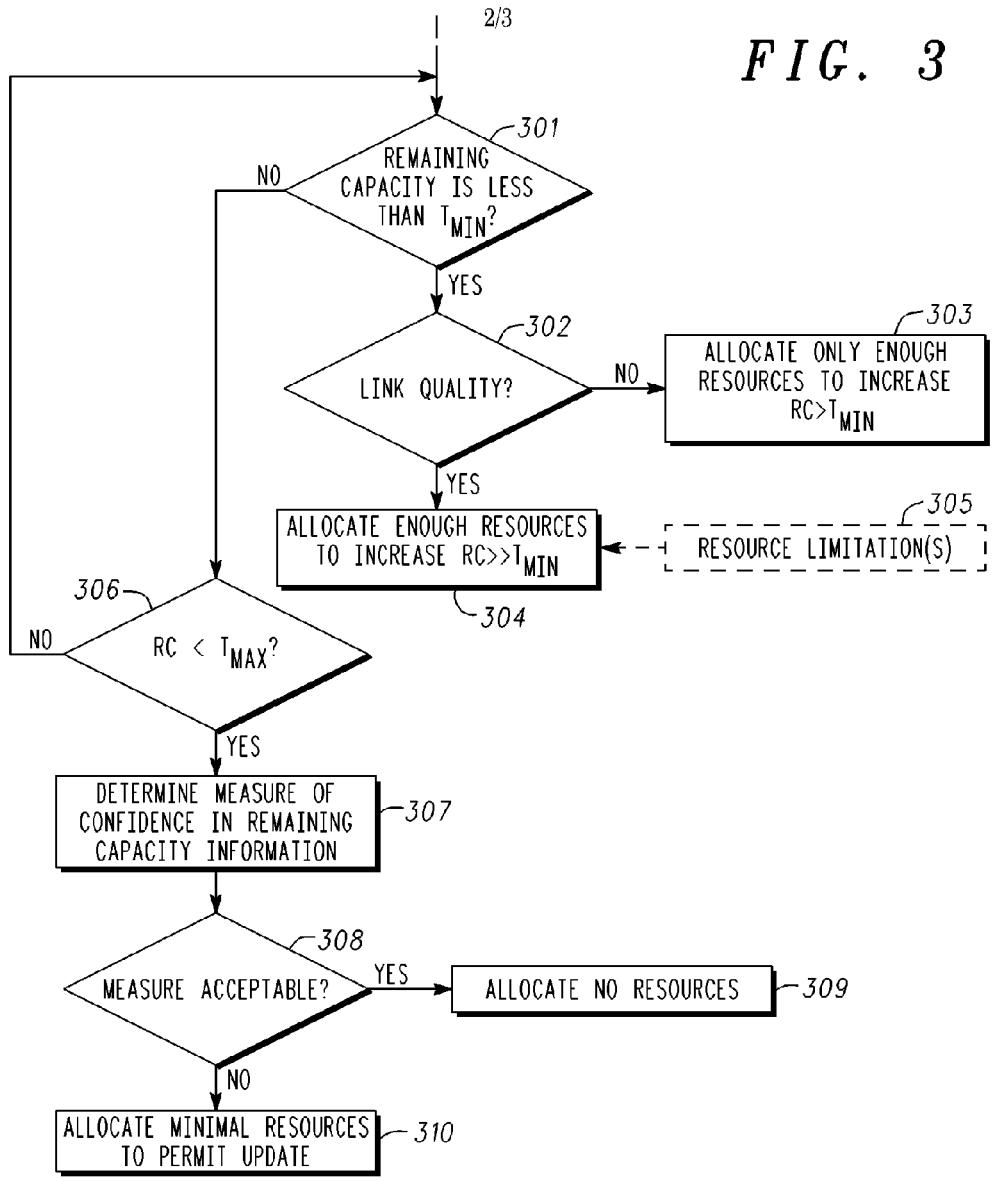
FIG. 3 comprises a flow diagram as configured in accordance with various embodiments of the invention.

There are numerous ways by which such a step can be accommodated and implemented in a given application setting. Referring now to FIG. 3, some illustrative examples in this regard will be described. Those skilled in the art will recognize and understand that these examples are intended to serve only in an illustrative capacity and are not intended to comprise an exhaustive listing of all possibilities in this regard.

By one approach, the coordinator node can use the remaining capacity information to determine 301 when the remaining capacity is less than a predetermined minimum threshold. The particular threshold level used can vary as desired, and may vary, for example, from platform to platform and/or system to system. The particular minimum threshold level employed can also vary, if desired, with the operational settings and or requirements as may tend to characterize a given deployment paradigm. For example, in an application setting where a given node is likely to capture and buffer larger quantities of information, or any quantity of information on a relatively frequent basis, it may be expected that the outbound payload memory will tend to fill up more quickly than in another, less demanding application setting. In such a case, it might be desired to select a minimum threshold value that is smaller rather than larger. Examples of such a minimum threshold might include, but are not limited to, 5%, 10%, 15%, 20%, 25%, and so forth.

When the remaining capacity is not less than this predetermined minimum threshold, this process can simply carry on as may otherwise be desired. When the remaining capacity is less than this predetermined minimum threshold, however, this process can then provide for automatically and responsively determining at least one measure of link quality for a communication path to the corresponding wireless node and determining 302 whether that level of link quality comprises at least a minimum acceptable level of link quality. There are various ways that are presently known by which such a measure of link quality can be ascertained and measured. Some examples include, but are not limited to, bit error rate, signal to noise ratio, and so forth.

When the applicable link quality is less than a minimum level of link quality, this process will accommodate allocating 303 substantially only a sufficient quantity of the aforementioned wireless communication resource as are reasonably necessary to permit increasing the remaining capacity to more than the predetermined minimum threshold. As used herein, however, this will be understood to mean not requiring that the outbound payload memory be effectively or substantially emptied.

Conversely, when the measured link quality is at least equal to this minimum level of link quality, this process can tend instead to allocate 304 a quantity of the at least one wireless communication resource(s) as will be sufficient to increase the remaining capacity of the outbound payload memory to considerably more than the aforementioned predetermined minimum threshold. Contrary to the step previously described, this can include, if desired, effectively or substantially emptying the outbound payload memory. If desired, the described step can further comprise tending to allocate available communication resources subject to modification as a further function of at least one other resource limitation 305 as pertains to the wireless node itself and/or the severely resource-constrained wireless network. As but one example in this regard, this can comprise modifying the decision to allocate a given number of communication resources to a lesser amount in order to accommodate a dwindling power supply for a given wireless node.

So configured and arranged, these teachings will permit a wireless node having a relatively full outbound payload memory to be provided with substantial communication resources to thereby facilitate emptying that memory, while reducing the quantity of communication resources that might otherwise be allocated under such memory conditions when the communication path itself is relatively poor and/or when other applicable resource limitations apply. This integrated application and use of such operational parameters and circumstances serves to intelligently balance system resource allocation needs and limitations against local outbound memory status and resource constraints.

These teachings will also accommodate determining 306 when the remaining capacity exceeds a predetermined maximum threshold (as when the wireless node has more than some given quantity of available outbound payload memory space). Again, such a value can vary with respect to the needs and/or opportunities as may apply with respect to a given application setting and/or the preferences of a given system administrator. Examples might comprise, but are not limited to, 95% remaining capacity, 90% remaining capacity, 85% remaining capacity, and so forth as desired.

When the remaining capacity does exceed such a predetermined maximum threshold, these teachings can then provide for automatically determining 307 a measure of confidence in the information regarding the remaining capacity of the outbound payload memory for the wireless node in question. As noted above, this information, though perhaps relatively recent, may nevertheless be outdated. Such a circumstance can arise, for example, when the wireless node only reports its memory state information from time to time or upon demand of the coordinator node. In such a case, this determination 307 can comprise, for example, determining a given amount of time that has passed since the coordinator node last received current information from a given wireless node. As another example, this might comprise counting a number of resource re-allocation periods (such as, for example, beacon periods or intervals as are known in the art) that have passed since the coordinator node last received such information. Those skilled in the art will understand and recognize that these teachings will accommodate other approaches to making such a determination as well.

This process then provides for determining 308 whether this measure of confidence is acceptable. When the measure of confidence is acceptable, this process can lead to no communication resources being currently allocated 309 to the corresponding wireless node. By this approach, this process is able to essentially rely upon the relative reliability of its information regarding the state of the wireless node's outbound payload memory and the relatively large amount of remaining capacity that this memory likely enjoys to avoid presently allocating communication resources to this wireless node. This, in turn, reduces transmission requirements for the wireless node, hence conserving the operational resources of that wireless node while also freeing up that corresponding communication resource in favor of other wireless nodes having a genuine present need for such resources.

When the measure of confidence is not acceptable, however, this process can provide instead for allocating 310 a substantially minimal quantity of the aforementioned communication resource to the wireless node to thereby permit this wireless node to update their information regarding the remaining capacity of the outbound payload memory. When the communication resource comprises, for example, time slots during which the wireless node can transmit its information, such an approach might provide for allocating a single such time slot that the wireless node can employ to update its memory state information.

By one approach, if desired, "minimal" can refer to that quantity of allocatable communication resources as is minimally required to permit the wireless node to provide an update regarding the remaining capacity of its outbound payload memory. Accordingly, the expression "substantially minimal" would be understood to refer to a quantity of allocatable communication resources as is approximately minimally required to permit the wireless node to provide such an update, and hence would include both the "minimal" quantity noted above as well as some slightly larger quantity (for example, when ten slots are available, and only one comprises the minimal quantity required for this purpose, a substantially minimal quantity might comprise two, but not five, of these time slots). It would also be possible, if desired, to provide somewhat more than this bare minimum quantity of communication resources to address some additional need or opportunity as may be occasionally or constantly present in a given application setting.

Figure 4:
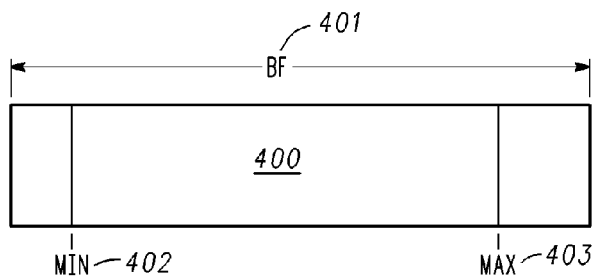
FIG. 4 comprises a schematic representation as configured in accordance with various embodiments of the invention.

For the sake of illustration, a more specific example will now be provided. This example makes use of nomenclature that may be better understood by referring now to FIG. 4. This schematic depiction of an outbound payload memory 400 portrays that memory 400 as having a maximum buffer size BF 401. This example further makes use of a minimum value MIN 402 and a maximum value MAX 403 as are described in further detail below. Those skilled in the art will recognize and understand that the specifics of this example serve an illustrative purpose only and are not offered with any suggestion or intent that these specifics comprise an exhaustive listing of all such possibilities in this regard.

This example assumes that the buffer size BF 401 of any given wireless node $N_i$ is $BF_i$. Without loss of generality, it may also be assumed that such a node $N_i$ fills its outbound payload memory 400 with data at a rate of $R_i$ bytes per resource re-allocation period, where $R_i$ may comprise a time varying function as will be well understood by those skilled in the art. Such variability can be owing to one or more of the following:

The sensors associated with a given node may have a time varying sampling period. For example, if a certain condition is triggered, the sample rate may be increased as well. After this condition concludes, the sampling rate may then reduce again to some lower rate;

The traffic that passes through a given node that comprises a part of a routing path for other wireless nodes is often not a time-independent function. In such a case, a given node, for example, may have the capability and authority to refuse to participate in such a routing path from time to time; to note but a few examples in this regard.

For the sake of simplicity, it will also be assumed that all of the nodes in the network at issue are equipped with a same transceiver that is capable of transmitting $R_r$ bytes per allocated time slot.

Assume now that the number of bytes in the outbound payload memory 400 of node $N_i$ is $M_i$ at the end of resource re-allocation period K. Now let $MAX_i=\alpha*BF_i$ where $\alpha$ is an application dependent time varying parameter and $0.5<\alpha\leq 1$. $MAX_i$ can be presumed to basically comprise a function of corresponding data traffic statistics and is being used to evaluate the state of the node's outbound payload memory.

Consistent with these teachings, when $M_i>MAX$, then node $N_i$ can allocate an appropriate number of communication resources comprising, in this example, time slots in order to relieve the apparent operational pressures on its output payload memory. When the communications channel between $N_i$ and its coordinator node is poor, and again consistent with these teachings, the coordinator node can allocate to $N_i$ only a number of time slots that is sufficient to reduce the number of bytes in $N_i$'s outbound payload memory to something somewhat less than $MAX_i$, as packets transmitted via this communication channel have a higher probability of being corrupted during transit. On the other hand, when the channel quality between node $N_i$ and the coordinator node is good, the coordinator can allocate to node Ni as many time slots as may be reasonably available (subject to other constraints such as, for example, remaining battery life at node Ni).

Mathematically, the number of time slots that should be allocated to a node $N_i$ in view of such considerations can be expressed as follows:

$$TS_i = \begin{cases} \min\left(\max\left(\frac{M_i-MAX_i}{R_r}, TS(LQI_i, LR_i)\right), \frac{M_i}{R_r}\right) & \to \text{if } M_i > Max_i \\ TS(LQ_i, LR_i) & \to \text{if } MIN_i \leq M_i \leq MAX_i \\ 0 & \to \text{if } M_i < MIN_i \text{ and the node} \\ & \quad \text{had been allocated a time slot} \\ & \quad \text{in the last } \lambda \text{ beacon periods} \\ 1 & \to \text{if } M_i < MIN_i \text{ and the node} \\ & \quad \text{has not been allocated a time} \\ & \quad \text{slot in the last } \lambda \text{ beacon periods} \end{cases}$$

where $LQI_i$ comprises a link quality indicator of choice to reflect the link quality of the communication channel and $LR_i$ comprises a local resource indicator of choice to reflect some local resource constraint of choice (such as, but not limited to, local expected battery reserves or remaining battery life).

The $TS(LQ_i,LR_i)$ term represents the number of time slots that would be allocated to node $N_i$ based on link quality and, in this example, battery level for node $N_i$ assuming an unlimited buffer size. The first term in the max expression serves to cover the case when the node's outbound payload memory is above an acceptable threshold MAX 403 but the channel quality is poor. The second term covers the case when the channel quality is good and leads the coordinator node to allocate as many slots as possible to node $N_i$ (subject to other constraints as may be applicable). The second term of the min expression serves to cover the ideal case (that is, when there are no constraints placed on the node and the network).

When the amount of data in the outbound payload memory 400 is below a certain threshold $MIN_i$, the node can be viewed as not having enough data to transmit. Those skilled in the art will recognize that $MIN_i$ can either be determined experimentally (being application dependent) or can be set to $R_r$. Such a condition receives one of two basic treatments in this example. Generally speaking, when this condition exists, no time slots should be allocated in order to avoid a misallocation of scarce bandwidth resources. When, however, the node has not been allocated any time slots for more than a given number of consecutive resource re-allocation periods $\lambda$, the coordinator node should allocate one time slot to node $N_i$ to permit the latter to update the buffer status information that is available to the coordinator node.

Generally speaking, it will be observed that this approach tends to maintain the buffer level between the MIN value 402 and the MAX value 403 while also tending to maximize the average capacity of the network itself. Thus, management of both the outbound payload memory of the wireless nodes and the network's bandwidth allocation processes are integrally combined in a useful and beneficial manner.

With continuing reference to the mathematical expressions set forth above, those skilled in the art may note that the following inequality can be true:

$$\sum_{i=0}^{TNN} TS_i > TS_{beacon}$$

where TNN represents the total number of nodes in the network less the coordinator node and $TS_{beacon}$ represents the total number of time slots available within a given resource re-allocation period. When such a condition prevails, the number of time slots allocated to each node can be normalized if desired. One approach to effecting such normalization can be represented as follows:

$$TS_i = \frac{TS_i^1}{\sum_{j=1}^{TNN} TS_i^1} * TS_{beacon}$$

wherein $TS_i^1$ represents the number of slots allocated to node $N_i$ and is otherwise calculated according to the mathematical expression set forth above.

Figure 5:
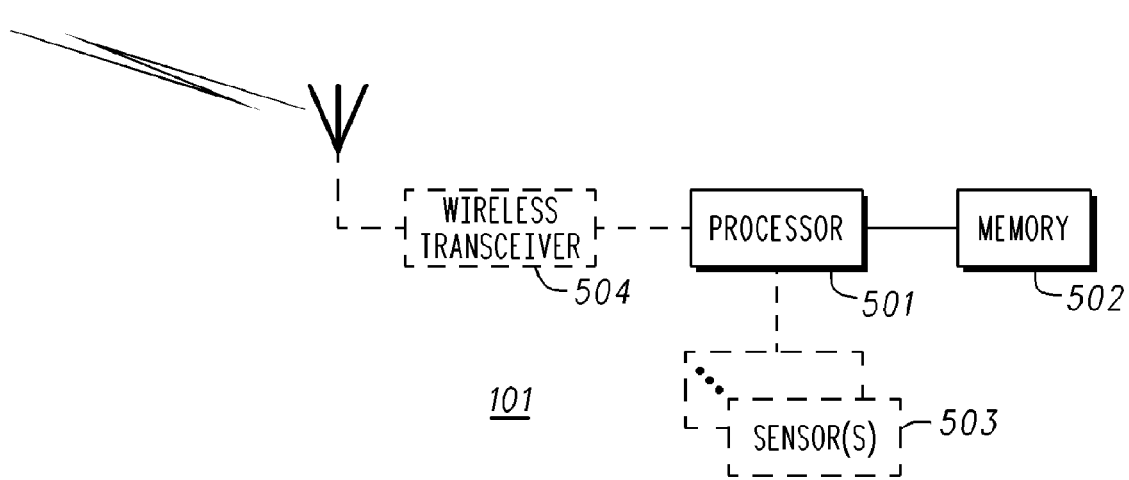
FIG. 5 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 5, an illustrative approach to such a platform will now be provided.

In this illustrative example, the apparatus comprises a coordinator node 101 for a wireless sensor network as described above, though other possibilities are possible. In this example, the coordinator node 101 comprises a processor 501 that operably couples to a memory 502. Such a coordinator node 101 may also comprise a wireless transceiver 504 that operably couples to the processor 501 and by which the processor 501 can effect communications with the wireless nodes as comprise the wireless sensor network. It is also possible that such a coordinator node 101 can itself further comprise, if desired, one or more sensors 503 that also operably couple to the processor 501. Such components are generally well known in the art and require no further elaboration here.

The processor 501 can comprise a dedicated purpose platform or can comprise a partially or wholly programmable platform as desired. Such architectural choices are well understood in the art. The memory 502 can serve, at least in part, to retain information regarding the remaining capacity of the outbound payload memories of the wireless nodes as comprise at least a portion of the aforementioned wireless network. The process 501, in turn, can be configured and arranged (via, for example, appropriate programming as will be well understood by those skilled in the art) to carry out one or more of the aforementioned steps, actions, and functions. This can comprise, in particular, configuring and arranging the processor 501 to automatically use the aforementioned information regarding the remaining capacities of the outbound payload memories of the wireless network nodes in integral combination with a bandwidth allocation management process to thereby control allocation of at least one wireless communication resource by which these wireless nodes can transmit the informational items that are contained in their outbound payload memories.

Those skilled in the art will recognize and understand that such an apparatus 101 may be comprised of a plurality of physically distinct elements as is suggested by the illustration shown in FIG. 5. It is also possible, however, to view this illustration as comprising a logical view, in which case one or more of these elements can be enabled and realized via a shared platform. It will also be understood that such a shared platform may comprise a wholly or at least partially programmable platform as are known in the art.

Those skilled in the art will recognize and appreciate that these teachings are highly scalable and will serve in a wide variety of application settings and in conjunction with a widely varying population of wireless nodes. These teachings are also readily implemented with a variety of existing legacy systems. When implemented, these teachings serve to prompt efficient allocation of available bandwidth resources while also tending to ensure that memory resources within the network remain viable and effective with respect to serving their core application purposes.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method to facilitate managing communications with at least one wireless node having outbound payload memory in a severely resource-constrained wireless network, the method comprising:

at a coordinator node for the severely resource-constrained wireless network:
providing information regarding remaining capacity of the outbound payload memory;
automatically using the information regarding the remaining capacity of the outbound payload memory in integral combination with a bandwidth allocation management process to control allocation of at least one wireless communication resource by which the at least one wireless node can transmit items contained in the outbound payload memory; and
wherein automatically using the information regarding the remaining capacity of the outbound payload memory in integral combination with a bandwidth allocation management process to control allocation of at least one wireless communication resource by which the at least one wireless node can transmit items contained in the outbound payload memory comprises, at least in part:
when the remaining capacity is less than a predetermined minimum threshold, automatically determining at least one measure of link quality for a communication path to the at least one wireless node;
when the measure of link quality is less than a minimum level of link quality, allocating substantially only a sufficient quantity of the at least one wireless communication resource to increase the remaining capacity to more than the predetermined minimum threshold.

2. The method of claim 1 wherein the at least one wireless node comprises a wireless sensor node.

3. The method of claim 1 wherein providing information regarding remaining capacity of the outbound payload memory comprises, at least in part, receiving the information from the at least one wireless node.

4. The method of claim 1 wherein providing information regarding remaining capacity of the outbound payload memory comprises providing at least recent, though possibly outdated, information regarding remaining capacity of the outbound payload memory.

5. The method of claim 1 wherein automatically using the information regarding the remaining capacity of the outbound payload memory in integral combination with a bandwidth allocation management process to control allocation of at least one wireless communication resource by which the at least one wireless node can transmit items contained in the outbound payload memory comprises, at least in part:

when the measure of link quality is at least equal to the minimum level of link quality, tending to allocate a quantity of the at least one wireless communication resource sufficient to increase the remaining capacity to considerably more than the predetermined minimum threshold.

6. The method of claim 5 wherein tending to allocate a quantity of the at least one wireless communication resource sufficient to increase the remaining capacity to considerably more than the predetermined minimum threshold further comprises tending to allocate available wireless communication resources to the at least one wireless node subject to modification as a further function of at least one other resource limitation of at least one of the wireless node and the severely resource-constrained wireless network.

7. A method to facilitate managing communications with at least one wireless node having outbound payload memory in a severely resource-constrained wireless network, the method comprising:
 at a coordinator node for the severely resource-constrained wireless network:
  providing information regarding remaining capacity of the outbound payload memory;
  automatically using the information regarding the remaining capacity of the outbound payload memory in integral combination with a bandwidth allocation management process to control allocation of at least one wireless communication resource by which the at least one wireless node can transmit items contained in the outbound payload memory; and
 wherein automatically using the information regarding the remaining capacity of the outbound payload memory in integral combination with a bandwidth allocation management process to control allocation of at least one wireless communication resource by which the at least one wireless node can transmit items contained in the outbound payload memory comprises, at least in part:
  when the remaining capacity exceeds a predetermined maximum threshold, automatically determining a measure of confidence in the information regarding remaining capacity of the outbound payload memory for the at least one wireless node;
  when the measure of confidence is acceptable, not allocating the at least one wireless communication resource to the at least one wireless node.

8. The method of claim 7 wherein automatically using the information regarding the remaining capacity of the outbound payload memory in integral combination with a bandwidth allocation management process to control allocation of at least one wireless communication resource by which the at least one wireless node can transmit items contained in the outbound payload memory comprises, at least in part:
 when the measure of confidence is not acceptable, allocating a substantially minimal quantity of the at least one wireless communication resource to the at least one wireless node to thereby permit the at least one wireless node to update the information regarding the remaining capacity of the outbound payload memory.

9. The method of claim 8 wherein automatically determining a measure of confidence in the information regarding remaining capacity of the outbound payload memory for the at least one wireless node comprises, at least in part, determining whether a number of resource re-allocation periods have passed since receiving the information regarding the remaining capacity of the outbound payload memory comprises an acceptable number of resource re-allocation periods.

10. A coordinator node for a severely resource-constrained wireless network to facilitate managing communications with at least one wireless node having outbound payload memory in the severely resource-constrained wireless network, the coordinator node comprising:
 a memory having information regarding remaining capacity of the outbound payload memory of all the nodes in the wireless network stored therein;
 a processor operably coupled to the memory and being configured and arranged to automatically use the information regarding the remaining capacity of the outbound payload memory of all the nodes in the wireless network in integral combination with a bandwidth allocation management process to control allocation of at least one wireless communication resource by which the at least one wireless node can transmit items contained in the outbound payload memory; and
 wherein the processor is further configured and arranged to automatically use the information regarding the remaining capacity of the outbound payload memory in integral combination with a bandwidth allocation management process to control allocation of at least one wireless communication resource by which the at least one wireless node can transmit items contained in the outbound payload memory by, at least in part:
  when the remaining capacity is less than a predetermined minimum threshold, automatically determining at least one measure of link quality for a communication path to the at least one wireless node;
  when the measure of link quality is less than a minimum level of link quality, allocating substantially only a sufficient quantity of the at least one wireless communication resource to increase the remaining capacity to more than the predetermined minimum threshold.

11. The coordinator node of claim 10 wherein the at least one wireless node comprises a wireless sensor node.

12. The coordinator node of claim 10 wherein the information regarding remaining capacity of the outbound payload memory comprises, at least in part, information that has been received from the at least one wireless node.

13. The coordinator node of claim 10 wherein the information regarding remaining capacity of the outbound payload memory comprises at least recent, though possibly outdated, information regarding remaining capacity of the outbound payload memory.

14. The coordinator node of claim 10 wherein the processor is further configured and arranged to automatically use the information regarding the remaining capacity of the outbound payload memory in integral combination with a bandwidth allocation management process to control allocation of at least one wireless communication resource by which the at least one wireless node can transmit items contained in the outbound payload memory by, at least in part:
 when the measure of link quality is at least equal to the minimum level of link quality, tending to allocate a quantity of the at least one wireless communication resource sufficient to increase the remaining capacity to considerably more than the predetermined minimum threshold.

15. The coordinator node of claim 14 wherein the processor is further configured and arranged to tend to allocate a quantity of the at least one wireless communication resource sufficient increase the remaining capacity to considerably more than the predetermined minimum threshold by tending to allocate available wireless communication resources to the at least one wireless node subject to modification as a further function of at least one other resource limitation of at least one of the wireless node and the severely resource-constrained wireless network.

16. A coordinator node for a severely resource-constrained wireless network to facilitate managing communications with at least one wireless node having outbound payload memory in the severely resource-constrained wireless network, the coordinator node comprising:
- a memory having information regarding remaining capacity of the outbound payload memory of all the nodes in the wireless network stored therein;
- a processor operably coupled to the memory and being configured and arranged to automatically use the information regarding the remaining capacity of the outbound payload memory of all the nodes in the wireless network in integral combination with a bandwidth allocation management process to control allocation of at least one wireless communication resource by which the at least one wireless node can transmit items contained in the outbound payload memory; and
- wherein the processor is further configured and arranged to automatically use the information regarding the remaining capacity of the outbound payload memory in integral combination with a bandwidth allocation management process to control allocation of at least one wireless communication resource by which the at least one wireless node can transmit items contained in the outbound payload memory by, at least in part:
- when the remaining capacity exceeds a predetermined maximum threshold, automatically determining a measure of confidence in the information regarding remaining capacity of the outbound payload memory for the at least one wireless node;
- when the measure of confidence is acceptable, not allocating the at least one wireless communication resource to the at least one wireless node.

17. The coordinator node of claim 16 wherein the processor is further configured and arranged to automatically use the information regarding the remaining capacity of the outbound payload memory in integral combination with a bandwidth allocation management process to control allocation of at least one wireless communication resource by which the at least one wireless node can transmit items contained in the outbound payload memory by, at least in part:
- when the measure of confidence is not acceptable, allocating a substantially minimal quantity of the at least one wireless communication resource to the at least one wireless node to thereby permit the at least one wireless node to update the information regarding the remaining capacity of the outbound payload memory.

18. The coordinator node of claim 17 wherein the processor is further configured and arranged to automatically determine a measure of confidence in the information regarding remaining capacity of the outbound payload memory for the at least one wireless node by, at least in part, determining whether a number of resource re-allocation periods as have passed since receiving the information regarding the remaining capacity of the outbound payload memory comprises an acceptable number of resource re-allocation periods.

* * * * *

UNITED STATES PATENT AND TRADEMARK OFFICE
CERTIFICATE OF CORRECTION

PATENT NO.         : 7,978,670 B2                                    Page 1 of 1
APPLICATION NO.    : 11/835221
DATED              : July 12, 2011
INVENTOR(S)        : Chiricescu, et al.

It is certified that error appears in the above-identified patent and that said Letters Patent is hereby corrected as shown below:

On the Title Page, in the Figure, above Tag "301", delete "2/3".

In the Drawings:

In Fig. 3, Drawing Sheet 2 of 3, above Tag "301", delete "2/3".

In the Specification:

In Column 7, Line 64, delete "Ni" and insert -- $N_i$ --, therefor.

In Column 7, Line 67, delete "Ni)." and insert -- $N_i$ ). --, therefor.

Signed and Sealed this
Sixteenth Day of April, 2013

Teresa Stanek Rea
*Acting Director of the United States Patent and Trademark Office*